United States Patent [19]
Groeber

[11] 3,747,922
[45] July 24, 1973

[54] PNEUMATIC TRANSPORT TRACK
[75] Inventor: Eugen Groeber, Salt Lake City, Utah
[73] Assignee: Sperry Rand Corporation, New York, N.Y.
[22] Filed: Dec. 27, 1971
[21] Appl. No.: 212,070

[52] U.S. Cl.................... 271/74, 302/2 R, 302/31
[51] Int. Cl.................... B65h 29/24, B65g 51/02
[58] Field of Search................ 271/74; 302/2 R, 302/29, 31

[56]  References Cited
UNITED STATES PATENTS

| | | | |
|---|---|---|---|
| 3,318,640 | 5/1967 | Coville | 302/31 |
| 3,622,151 | 11/1971 | Range et al. | 271/74 |
| 3,243,181 | 3/1966 | Lyman | 302/31 X |
| 3,136,539 | 6/1964 | Lyman | 302/29 X |

*Primary Examiner*—Evon C. Blunk
*Assistant Examiner*—W. Scott Carson
*Attorney*—Kenneth T. Grace et al.

[57]   ABSTRACT

A pneumatic device that receives spaced, singulated letter-mail documents in a vertical on-long-edge attitude and transports such documents along a transport track under pneumatic forces is disclosed.

11 Claims, 6 Drawing Figures

PATENTED JUL 24 1973 3,747,922

PNEUMATIC TRANSPORT TRACK

BACKGROUND OF THE INVENTION

The present invention relates to a document handling system and in particular to such a system in which a plurality of sheets are singulated and transported along a transport track in a vertical on-long-edge attitude. In my patent application Ser. No. 122,955, filed Mar. 10, 1971, now U.S. Pat. No. 3,698,538 there is disclosed a system for pneumatically singulating letter-mail documents and arranging such documents on their long edge with classifying indicia, such as stamps, facing in a like direction. After facing of such documents it is necessary to transport them along prescribed paths or tracks for subsequent sorting or the like. Prior art transport systems utilizing pure pneumatic devices have been utilized in systems for the movement of identical articles such as unit record cards. Because the movement of identical articles permits the designer to limit the ranges of required forces and spaces, such systems have operated most efficiently. Such a system may be represented by that of the C. B. Albright U.S. Pat. No. 3,411,829.

In the transport of letter-mail documents, however, such narrow ranges of forces and spaces is not permitted. As an example of the design criteria for a letter-mail transport system, the following have been established by the United States Post Office:

50,000 letters per hour
letter weight between 0.1 and 3.0 ounces
letter size between 3 × 4 ¾ and 5 ¾ × 11½ inches
letter thickness between 0.007 and 0.250 inch
jam rate 0.01 percent or less.

In addition to the above design criteria it is desired that such system operates satisfactorily with wet, soiled, dog eared and damaged documents. Using this wide range of operating conditions it is apparent that the design of prior art pneumatic transport systems cannot be extrapolated through mere design modification to perform satisfactorily.

SUMMARY OF THE INVENTION

In the transport track of the present invention there is provided a substantially open structure that is formed by a vertically oriented wall member and a horizontally oriented base member having an air escape slot therebetween that is situated along the intersection of their operative surfaces. The wall member has a plurality of skewer—upwardly and downwardly—positive air pressure transport air jet holes along its long dimension, i.e., along the track length. Associated with each transport air jet hole and directionally aligned rearwardly thereof is an entrainment air jet hole. The associated entrainment air jet forces a cushion of air between the transported document and the wall member for overcoming the effect of the associated transport air jet which, through the entrapment of air by the efflux of the transport air jet creates a suction between the transported document and the wall member. In using the high positive air pressure that is necessary to move the heavier documents along such transport track, such suction would otherwise draw the lightest documents into direct contact with the wall member causing such lighter documents to be slowed down or stopped. The associated entrainment air jet overcomes this retarding effect by ensuring that a cushion of air is provided between the transported documents and the wall member irrespective of their size or weight. In addition, the air escape slot permits the cushion of air to escape along the bottom edge of the transported document ensuring that a build-up of air pressure does not move the bottom edge of the transported document further away from the wall member than is the top edge. The arrangement maintains the transported document in its uniform vertical orientation and velocity during its passage through the transport track.

DESCRIPTION OF THE PREFERRED EMBODIMENT

Figure 1:
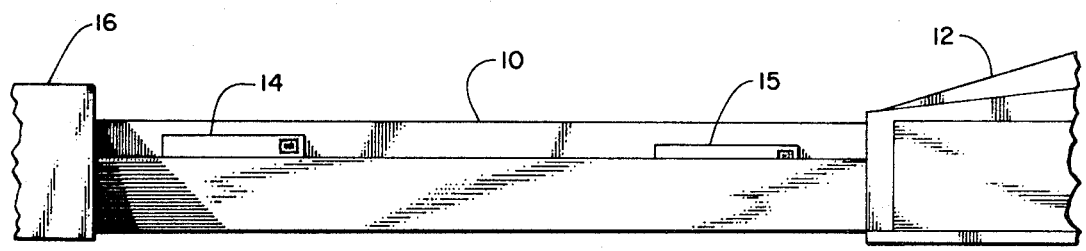
FIG. 1 is an illustration of a front view of a portion of a document handling system in which the transport track of the present invention may be incorporated.

With particular reference to FIG. 1 there is presented a front view of a portion of a document handling system in which the pneumatic transport track of the present invention may be incorporated. Pneumatic transport track 10 may be operatively coupled to a device 12 which fluidically singulates a stack of individual letter-mail documents 14, 15 in a vertical on-long-edge attitude and passes the stream of individual documents 14, 15 on to transport track 10 at its righthand or upstream end. Device 12 may be a pneumatic roll device such as that of my U.S. Pat. No. 3,698,538. Transport track 10 merely serves as a means for transporting the singulated documents 14, 15 at the desired spacing and velocity to another device 16 which may be a, e.g., facer-canceller.

Figure 2:
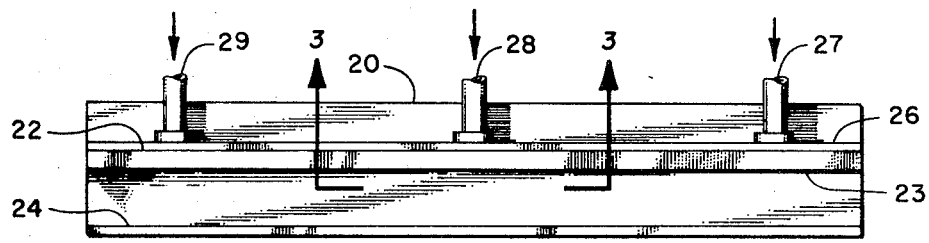
FIG. 2 is a plan view of the transport track of the present invention.

With particular reference to FIG. 2 there is presented a plan view of the pneumatic transport track 10 of FIG. 1. Transport track 10 essentially consists of a base member 20, a back wall member 22 and a front wall 24 all cooperatively forming a trough-like member for passing the singulated documents 14, 15 from the right-hand, upstream end to the lefthand, downstream end under pneumatic forces and along the front transport surface 23 of wall member 22. Wall member 22 and back plate member 26 form a plenum having sources 27, 28, 29 of positive air pressure coupled thereto.

Figure 3:
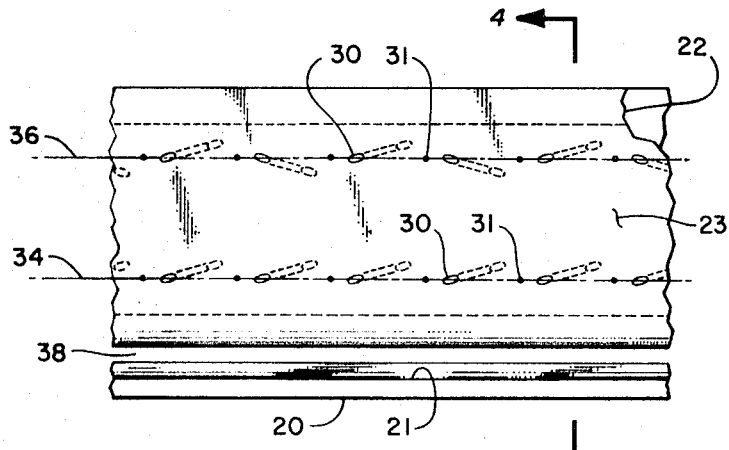
FIG. 3 is a partial front view of the transport track taken along line 3—3 of FIG. 2.

With particular reference to FIG. 3 there is presented a partial front view of transport track 10 taken along line 3—3 of FIG. 2. FIG. 3 illustrates a plurality of pairs of associated transport air jet holes 30 and entrainment air jet holes 31, all in the front transport surface 23 of wall member 22 and coupled to plenum 32 as formed by back plate member 26. In the preferred embodiment a plurality of pairs of associated holes 30, 31 are substantially aligned along first and second parallel lines 34, 36 which are oriented substantially parallel to the top surface 21 of base member 20. A first plurality of pairs of holes 30, 31 are oriented along a first line 34 in a generally downstream direction and along a direction line 50 which is oriented downwardly at an angle $\alpha = 15°$ to such top surface 21. Another plurality of pairs of holes 30, 31 are aligned along a second line 36 also substantially parallel to top surface 21 but further therefrom, and are also oriented in a generally downstream direction and along a direction line 50 which is oriented at an angle $\alpha = 15°$ to such top surface 21 but are alternately directed or skewed in an upward and downward direction. This orientation of pairs of holes 30, 31 along the first and second lines 34 and 36, respectively, is such that the jets of positive air pressure from the pairs of holes 30, 31:

along the first line 34 move the transported documents 14, 15 downstream along transport surface 23 of wall member 22 and downward toward top surface 21 of base member 20; and, along the second line 36 move the transported documents 14, 15 downstream along transport surface 23 of wall member 22. The upwardly directed transport air jets 30 serve the purpose of providing an air cushion between the upper part of the transported documents 14, 15 and transport surface 23 while both the upwardly and downwardly directed transport air jets 30 add up to a resultant force that is downstream and parallel to line 36.

Figure 4:
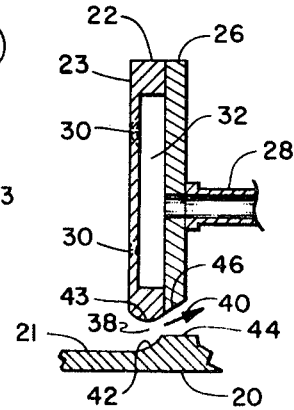
FIG. 4 is a cross-sectional view of the transport track taken along line 4—4 of FIG. 3.

With particular reference to FIG. 4 there is presented a cross-sectional view of transport track 10 taken along line 4—4 of FIG. 3. FIG. 4 is presented to illustrate that plenum 32 is formed by raised top and bottom back portions (and also two raised end back portions not illustrated) of wall member 22 and back plate 26 with sources 27, 28, 29 of positive air pressure coupled thereto. Illustrated in this figure is the nature of the slot-like air escape means 38 formed by and between wall member 22 and base member 20. Air escape means 38 provides a backwardly, slightly upwardly directed air escape stream 40 as formed by the concavely arcuate portion 42 which couples top surface 21 to surface 44 both of base member 20, and the chamfered back edge 46 of wall member 22. Additionally, it can be seen that the transport surface 23 is oriented substantially orthogonal to top surface 21. The concavely arcuate portion 42 causes a document 14, 15 that is not in the normal orthogonal orientation with top surface 21 to ride with its bottom edge eccentrically normal to and up on the concavely arcuate portion 42 and against the convexly arcuate portion 43 for the least or minimum frictional slow-down effect thereon. Additionally, the shape of the orifice of air escape means 38 prevents the lighter-weight documents 14, 15 from slipping therethrough or hanging-up therein.

Figure 5:
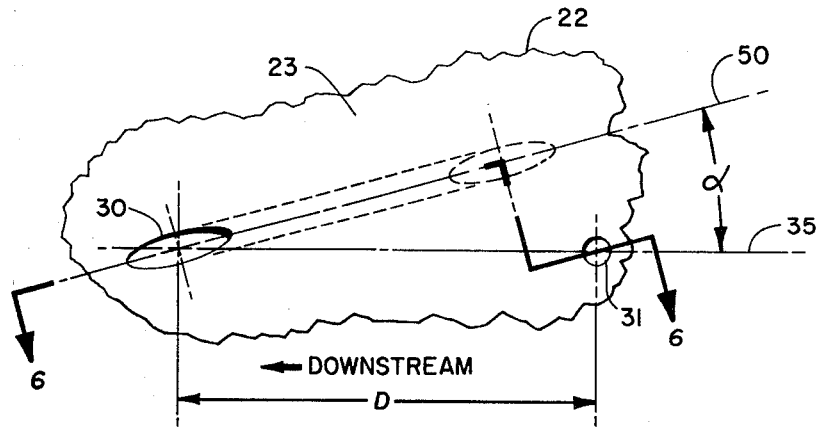
FIG. 5 is a detail view of a pair of associated air jet holes viewed normal to the transport surface of FIG. 3.

With particular reference to FIG. 5 there is presented a detail view of a pair of associated holes 30, 31 (transport air jet hole 30 and entrainment air jet hole 31) as viewed normal to transport surface 23. FIG. 5 is presented to illustrate, in detail, the relationship of transport air jet hole 30 and entrainment air jet hole 31 in which hole 31 is normal to transport surface 23 along direction line 51 (see FIG. 6) and along line 35 which line 35 is oriented substantially parallel to lines 34, 36 and through the centroid of hole 30 in transport surface 23. Direction line 50, in its projection upon transport surface 23, is oriented at an angle $\alpha$ of, e.g., substantially 15° to line 35. The hole 31 may in some cases be oriented upstream of hole 30 and along direction line 50; however, it has been discovered that such orientation, through the Coanda effect of the air in plenum 32 passing over hole 31 into hole 30, may actually create a vacuum in hole 31 and a corresponding suction upon the transported documents 14, 15. This, of course, is to be avoided, and, accordingly, it is preferred that the hole 31 be misaligned with direction line 50 such as on line 35 (or between lines 35 and 50) and a distance D upstream of hole 30 in transport surface 23.

Figure 6:
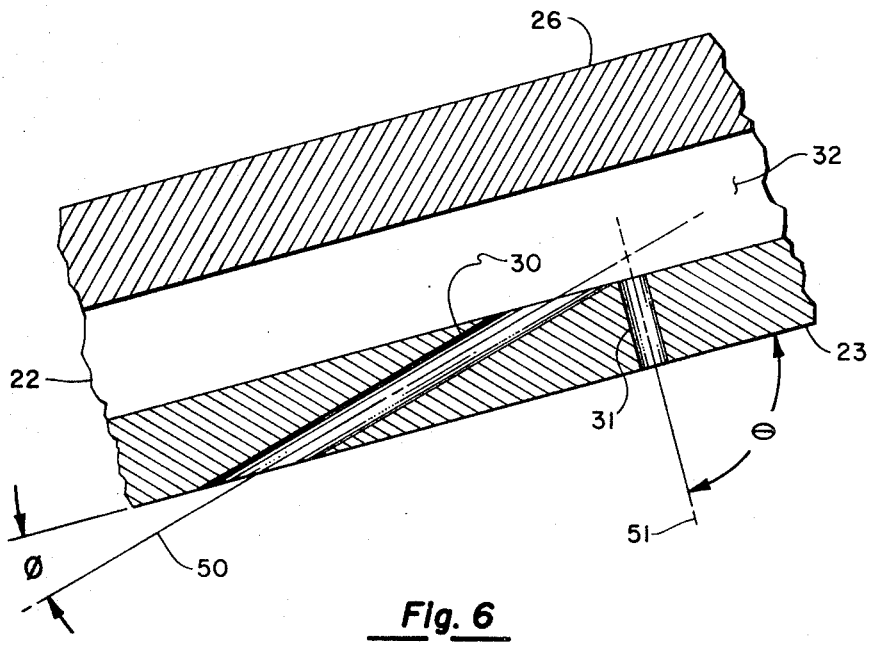
FIG. 6 is a cross-sectional view of a portion of the transport track taken along line 6—6 of FIG. 5.

With particular reference to FIG. 6 there is presented a cross-section view of wall member 22 of transport track 10 taken along line 6—6 of FIG. 5. FIG. 6 is presented to illustrate, in detail, the relationship of transport air jet hole 30 (and its direction line 50) and entrainment air jet hole 31 (and its direction line 51), said holes employed for coupling the positive air pressure plenum 32 to the ambient air pressure at transport surface 23. Direction line 50 is oriented at an angle $\phi$ of, e.g., substantially 15° to transport surface 23 for generating a transport air jet which provides a pneumatic propulsive force upon the transported documents 14, 15 in a downstream direction. Direction line 51 is oriented at an angle $\phi$ of, e.g., substantially 90° to the transport surface 23 and a distance D (see FIG. 5) upstream of transport air jet hole 30 at transport surface 23 and offset from direction line 50 for providing an entrainment air jet of positive air pressure to overcome the negative air pressure condition between the transported documents 14, 15 and transport surface 23 that would be otherwise generated by the transport air jets alone. In the preferred embodiment of the present invention the following perameters were utilized:

a. plenum 32 — 2.0 to 5.0 PSI positive air pressure
b. $\phi$ — 15°
c. $\theta$ — 90°
d. $D$ — 0.50 inch
e. $\alpha$ — 15°

What is claimed is:

1. A transport track for a document handling apparatus comprising:

a base member having a top surface;

a wall member having a transport surface that is located above said base member and is oriented substantially perpendicular to said top surface and comprising:

a plenum;

a plurality of pairs of associated transport air jet holes and entrainment air jet holes in said transport surface and coupled to said plenum;

each transport air jet hole oriented along a direction line that is directed downstream of said track at an acute angle to both said top surface and said transport surface;

each entrainment air jet hole aligned offset from the direction line of the associated transport air jet hole and upstream therefrom and along a direction line that is approximately perpendicular to said transport surface;

said wall member and said base member being uniformily, vertically spaced apart to form an air escape opening along the intersection of the projection of the planes of their operative transport and top surfaces for permitting air from said transport air jets and said entrainment air jets to escape therethrough backwardly of said transport surface.

2. The transport track of claim 1 wherein said transport air jet holes and said entrainment air jet holes are round holes of substantially 0.042 inch Dia. and 0.020 inch Dia., respectively.

3. The transport track of claim 1 wherein said wall member and said base member are uniformily, vertically spaced apart for a distance that substantially encompasses the spacing of said air jet holes along the length of said track.

4. The transport track of claim 1 wherein the ratio of the diameter of said transport air jet hole to the diameter of said entrainment air jet hole is substantially 2 to 1.

5. A transport track for a document handling apparatus comprising:
a base member;
a wall member having a transport surface and comprising:
a plenum;
a plurality of pairs of associated transport air jet holes and entrainment air jet holes in said transport surface and coupled to said plenum;
each transport air jet hole oriented along a direction line that is directed downstream of said track at an angle $\phi$ of substantially 15° with said transport surface;
each entrainment air jet hole aligned offset from the direction line of the associated transport air jet hole and upstream a distance D of substantially 0.50 inch therefrom and along a direction line that is at an angle $\phi$ of substantially 90° with said transport surface;
said wall member and said base member forming an air escape opening for permitting air from said transport air jet and said entrainment air jet to escape therethrough.

6. A transport track for a document handling apparatus comprising:
a wall member having a transport surface and comprising:
a plenum;
a plurality of pairs of associated transport air jet holes and entrainment air jet holes in said transport surface and coupled to said plenum;
each transport air jet hole oriented along a direction line that is directed downstream of said track at an angle $\phi$ that is less than 90° with said transport surface;
each entrainment air jet hole aligned offset from the direction line of the associated transport air jet hole and upstream a distance D therefrom and along a direction line that is at an angle $\theta$ with said transport surface;
a base member having a top surface;
said wall member and said base member forming an air escape opening for permitting air from said transport air jet and said entrainment air jet to escape therethrough, said top surface and said transport surface being oriented substantially orthogonally in the area of said air escape opening and wherein said top surface has a concavely arcuate portion directed upwardly toward said wall member in the area of said air escape opening.

7. The transport track of claim 6 wherein said wall member in the area of said concavely arcuate portion has a convexly arcuate portion extending from said transport surface into an upwardly directed chamfered portion across said concavely arcuate portion for directing air from said air escape opening in an upwardly directed direction away from said transport surface and said top surface.

8. A transport track for a document handling apparatus comprising:
a base member;
a wall member having a transport surface and comprising:
a plenum;
a plurality of pairs of associated transport air jet holes and entrainment air jet holes in said transport surface and coupled to said plenum;
each transport air jet hole oriented along a direction line that is directed downstream of said track at an angle $\phi$ that is less than 90° with said transport surface;
each entrainment air jet hole aligned offset from the direction line of the associated transport air jet hole and upstream a distance D therefrom and along a direction line that is at an angle $\theta$ with said transport surface;
said wall member and said base member forming an air escape opening for permitting air from said transport air jet and said entrainment air jet to escape therethrough;
said pairs of associated air jet holes being oriented along two lines that are parallel to said top surface in the area of said air escape opening;
the transport air jet holes along a first one of said lines being all oriented in a downward direction toward said top surface and in a downstream direction;
the transport air jet holes along the second one of said lines being alternately oriented in a downward and upward direction toward and away from said top surface, respectively, and in a downstream direction.

9. A transport track for a document handling apparatus comprising:
a long wall member having a planar transport surface and comprising:
a plenum;
a plurality of pairs of associated transport air jet holes and entrainment air jet holes in said transport surface and coupled to said plenum;
each transport air jet hole oriented along a direction line that is directed downstream of said track at an angle $\phi$ that is between 0° and 90° to said transport surface;
each entrainment air jet hole aligned offset from the direction line of the associated transport air jet hole and upstream a distance D therefrom and along a direction line that is at an angle $\theta$ of approximately 90° to said transport surface;
a long base member located below said wall member and having a planar top surface; said top surface and said transport surface being uniformily, vertically spaced apart to form at the junction of the projection of the planes of said top surface and said transport surface along the length of said track in the area of said pairs of associated transport air jet holes and entrainment air jet holes an air escape opening for directing air from said air jet holes therethrough and drawing the bottom edge of a transported document toward said transport surface said top surface and said transport surface are oriented substantially perpendicularly in the area of said air escape opening.

10. The transport track of claim 9 wherein said top surface has a concavely arcuate portion directed upwardly toward said wall member in the area of said air escape opening.

11. The transport track of claim 10 wherein said wall member in the area of said concavely arcuate portion has a convexly arcuate portion extending from said transport surface into an upwardly directed chamfered portion across said concavely arcuate portion for directing air from said opening in an upwardly directed direction away from said top surface and backwardly from said transport surface.

* * * * *

UNITED STATES PATENT OFFICE
CERTIFICATE OF CORRECTION

Patent No. 3,747,922　　　　　　　　　Dated　July 24, 1973

Inventor(s)　Eugen Groeber

It is certified that error appears in the above-identified patent and that said Letters Patent are hereby corrected as shown below:

Column 5, line 27, "∅" should read -- θ --. Column 6, lines 53 to 63, "said top surface ... toward said transport surface" should be indented to indicate that it is a separate paragraph; same line 63, insert a semicolon -- ; -- after "face"; line 54, "uniformily" should read -- uniformly --; Column 6, lines 63 to 65, "said top surface... air escape opening." should be indented to indicate that it is a separate paragraph.

Signed and sealed this 8th day of January 1974.

(SEAL)
Attest:

EDWARD M.FLETCHER,JR.　　　　　　RENE D. TEGTMEYER
Attesting Officer　　　　　　　　　Acting Commissioner of Patents